(12) United States Patent
Kim

(10) Patent No.: US 12,434,166 B1
(45) Date of Patent: Oct. 7, 2025

(54) EASY-STANDING DOMINO WITH TRAPEZOIDAL PROFILE

(71) Applicant: Keith Kim, Westbury, NY (US)

(72) Inventor: Keith Kim, Westbury, NY (US)

( * ) Notice: Subject to any disclaimer, the term of this patent is extended or adjusted under 35 U.S.C. 154(b) by 0 days.

(21) Appl. No.: 19/181,374

(22) Filed: Apr. 17, 2025

(51) Int. Cl.
*A63H 33/04* (2006.01)

(52) U.S. Cl.
CPC .................................. *A63H 33/04* (2013.01)

(58) Field of Classification Search
CPC .... A63F 9/28; A63F 2003/00485; A63F 9/20; A63H 33/04
USPC .............................................. 446/2; D21/391
See application file for complete search history.

(56) References Cited

U.S. PATENT DOCUMENTS

| | | | | |
|---|---|---|---|---|
| 331,652 A | * | 12/1885 | Richard | A63F 9/20 273/294 |
| 641,823 A | * | 1/1900 | Bloomingdale | A63F 9/20 273/294 |
| 778,245 A | * | 12/1904 | Howells | A63F 1/02 273/293 |
| 3,621,601 A | * | 11/1971 | Greenberg | A63F 9/28 446/2 |
| 4,248,433 A | * | 2/1981 | Soriano | A63F 9/28 273/282.1 |
| 4,358,274 A | * | 11/1982 | Chase | G09B 1/16 434/403 |
| 4,438,586 A | * | 3/1984 | Wildman | A63F 9/20 446/2 |
| 4,740,185 A | * | 4/1988 | Inglee | A63F 9/28 446/120 |
| 5,122,087 A | * | 6/1992 | Coccoli | A63F 9/28 446/2 |
| 5,478,085 A | * | 12/1995 | Canner | A63F 9/20 273/293 |

(Continued)

FOREIGN PATENT DOCUMENTS

| | | | |
|---|---|---|---|
| CN | 214075002 U | * | 8/2021 |
| CN | 119139683 A | * | 12/2024 |

OTHER PUBLICATIONS

Dyan Robson, "Magna-Tiles Dominoes", Oct. 27, 2014 (retrieved online May 27, 2025]. (Year: 2014).*

(Continued)

*Primary Examiner* — Kurt Fernstrom

(57) ABSTRACT

A toppling domino is disclosed, featuring a rectangular front and rear face with rounded edges and a tapered side profile-such as trapezoidal, triangular, or wedge-shaped—to enhance balance and reduce unintended tipping. The base is wider and heavier than the top, with an optional internal weight positioned near the base to lower the center of gravity. One surface may include textured features to improve grip, stackability, or accessibility. The shape enables modular stacking, allowing dominoes to form radial, circular, and layered configurations that support continuous and repeatable geometric patterns. The domino may be produced in size and color variants using materials such as biodegradable PLA, wood, or rubber, and may include features for educational grouping or therapeutic use. Optional tactile or sensory-response elements-such as sound, vibration, or color change—can provide feedback for users in special needs or interactive settings.

13 Claims, 14 Drawing Sheets

Combined side cross-sectional and perspective view of the domino illustrating the internal weight placement near the base

(56) References Cited

U.S. PATENT DOCUMENTS

| | | | | |
|---|---|---|---|---|
| 5,533,919 | A * | 7/1996 | Peterson | A63F 9/28 |
| | | | | 273/391 |
| 6,209,875 | B1 * | 4/2001 | Vildosola | A63F 9/20 |
| | | | | 273/308 |
| 7,832,732 | B1 * | 11/2010 | Torres | A63F 9/20 |
| | | | | 273/293 |
| 9,737,793 | B1 * | 8/2017 | Statzer | A63F 9/0415 |
| 2009/0108529 | A1 * | 4/2009 | Santini | A63F 9/20 |
| | | | | 273/296 |
| 2022/0157126 | A1 * | 5/2022 | Birkenmeyer | G07F 17/3213 |

OTHER PUBLICATIONS

The Craft Shop: Texture Dominoes, 2023 [retrieved online May 28, 2025]. (Year: 2023).*

* cited by examiner

FIG. 1: Front view
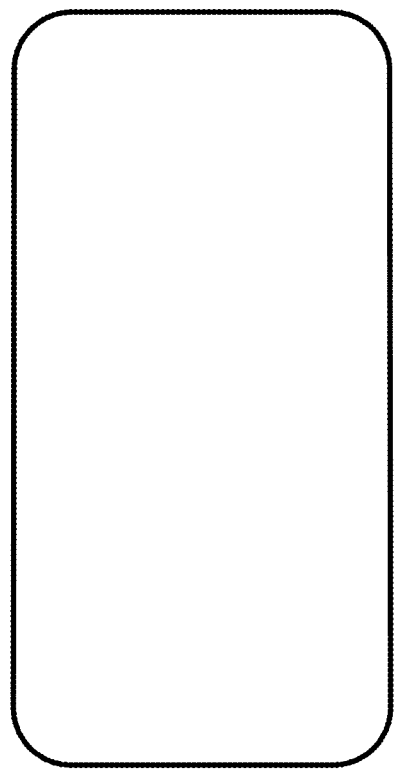

FIG. 2: Side view
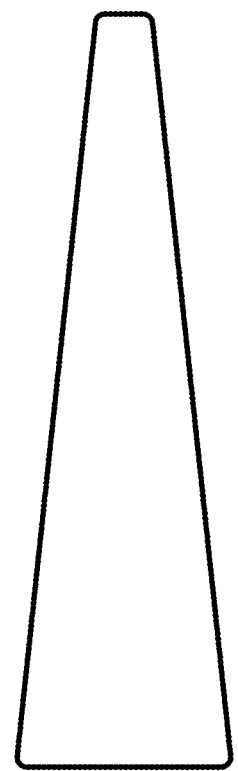

FIG. 3: Top view
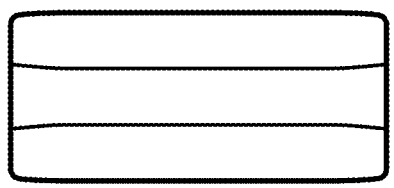

FIG. 4: Bottom view

FIG. 5: Perspective view of 3 variant sizes
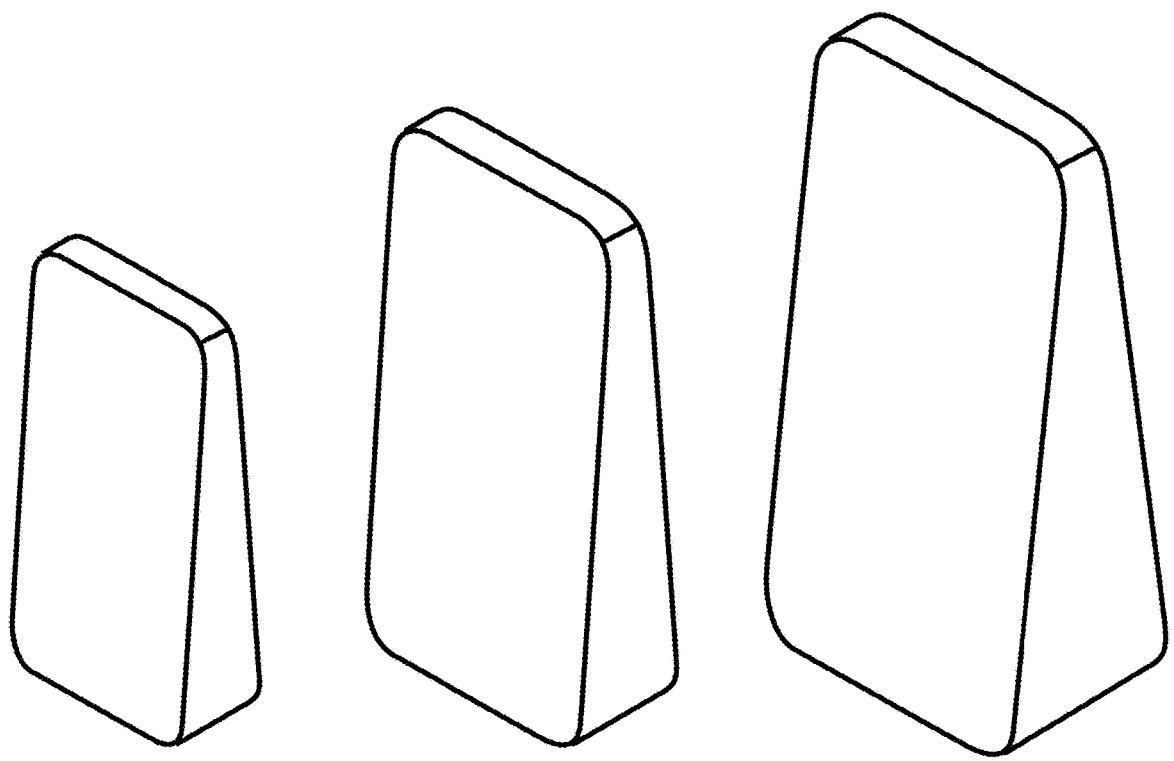

FIG. 6: Combined side cross-sectional and perspective view of the domino illustrating the internal weight placement near the base
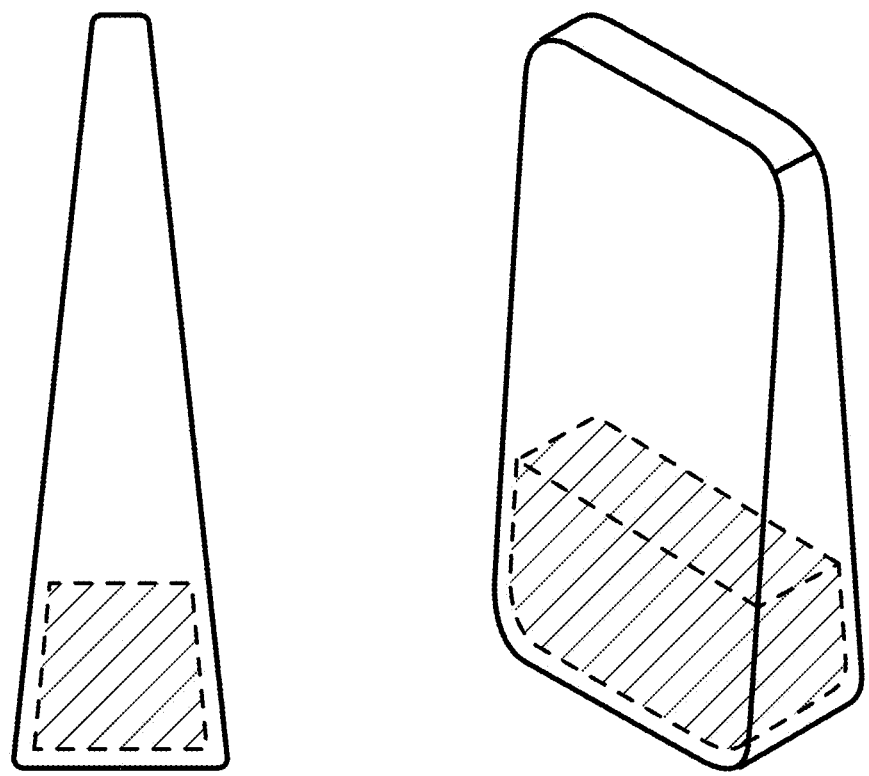

FIG. 7: Comparative view of center of gravity positions
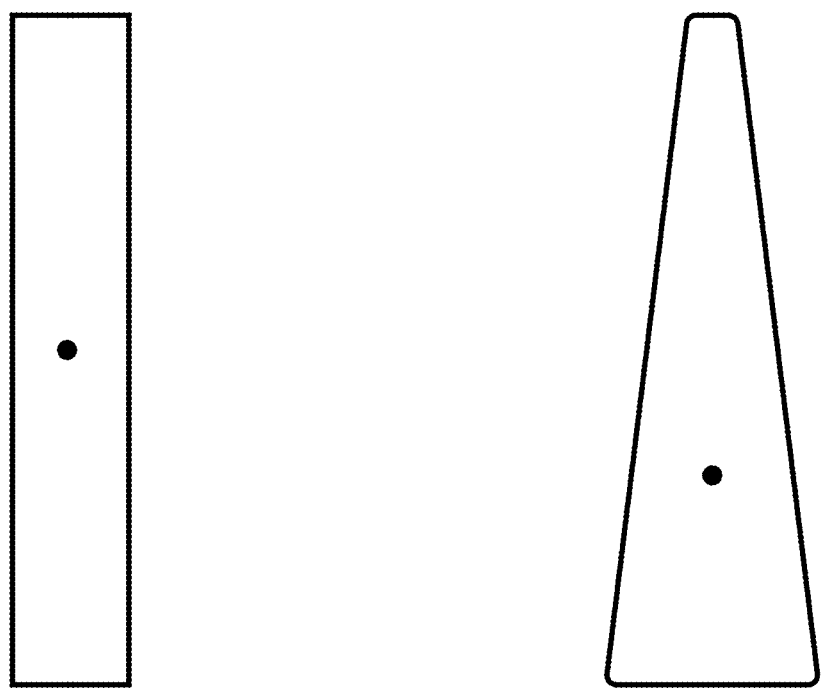

FIG. 8: Side view illustration of minimum and maximum tapered angles
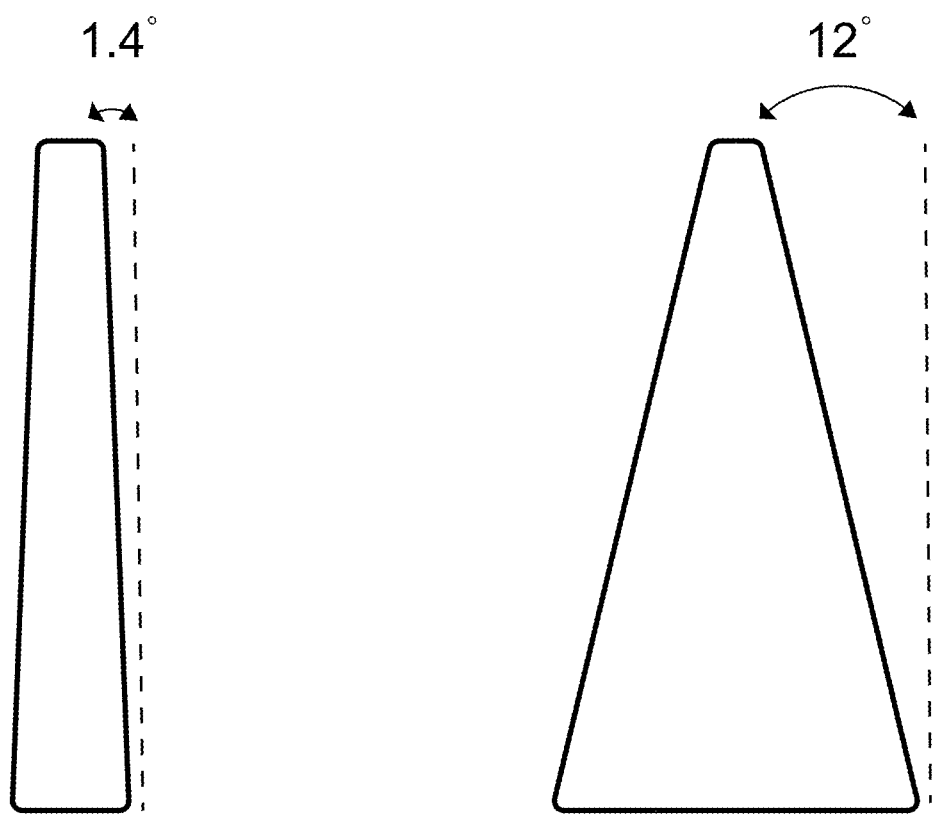

FIG. 9: Side view illustration of trapezoidal profile with a base that is at least 10% wider than the top
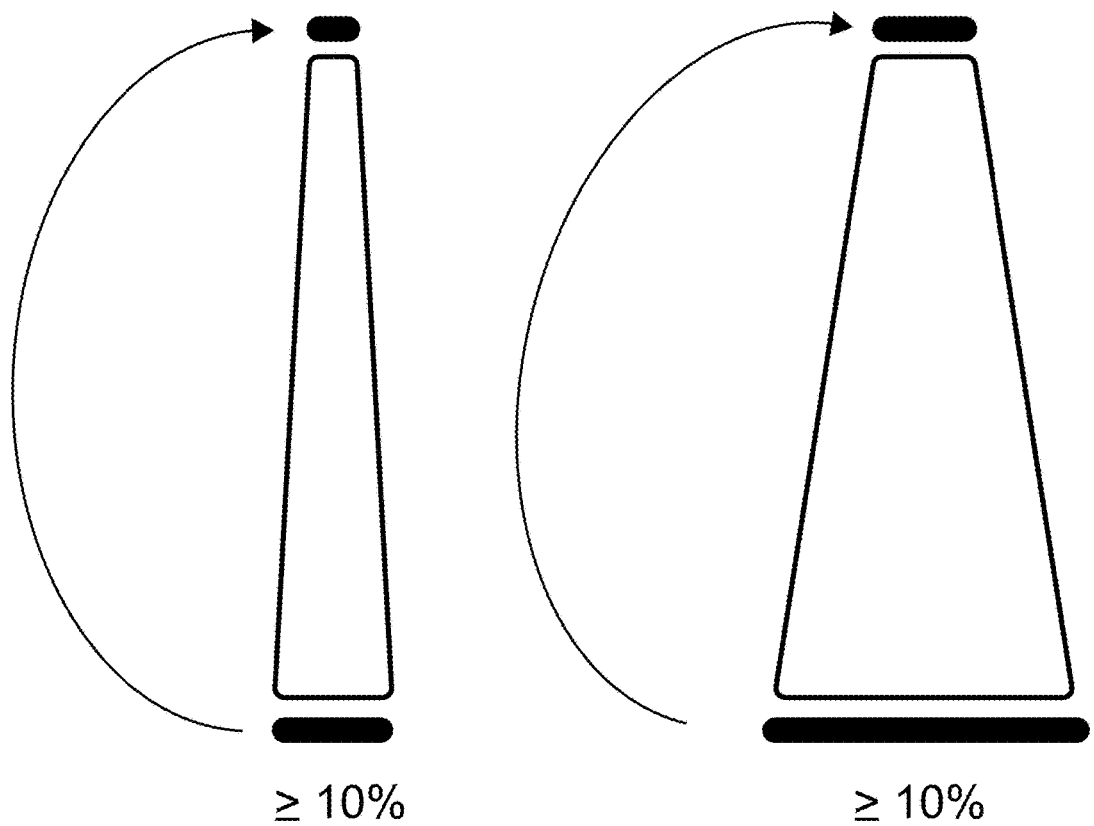

FIG. 10: Perspective view illustrating ridged texture on one side of the surface
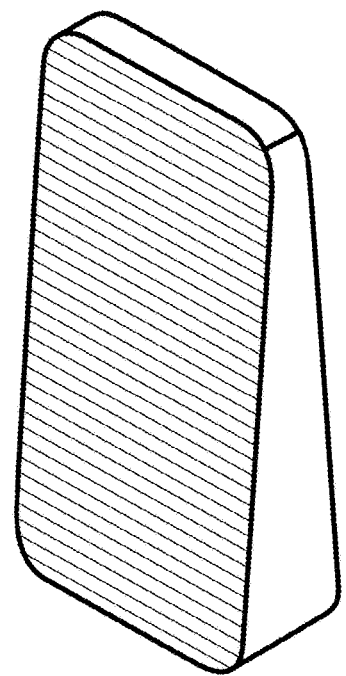

FIG. 11: Illustration of dominoes arranged in a horizontal stacking configuration for layered modular assembly
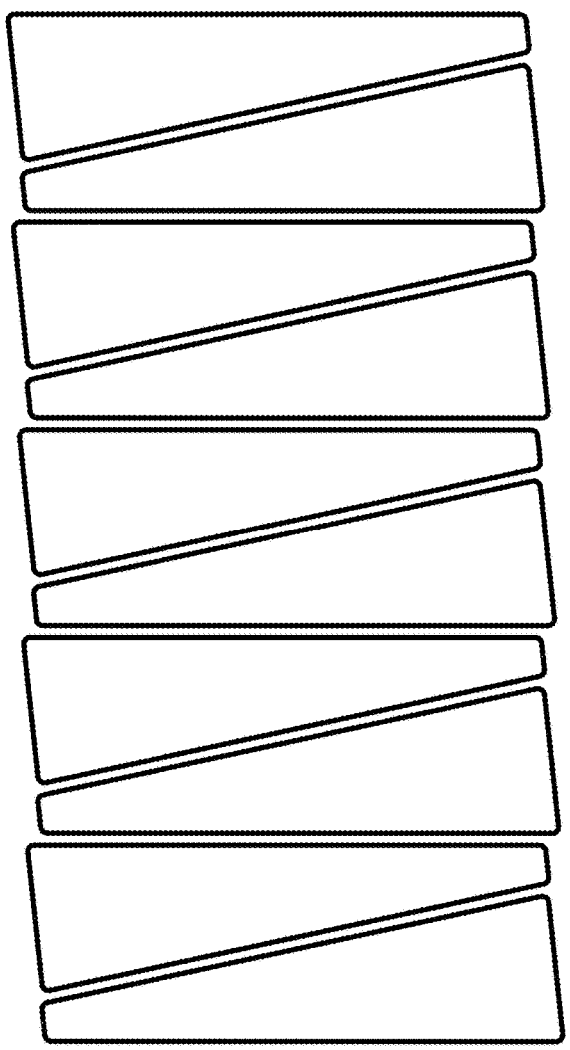

FIG. 12: Illustration of dominoes arranged in radial and circular configurations for modular spatial placement
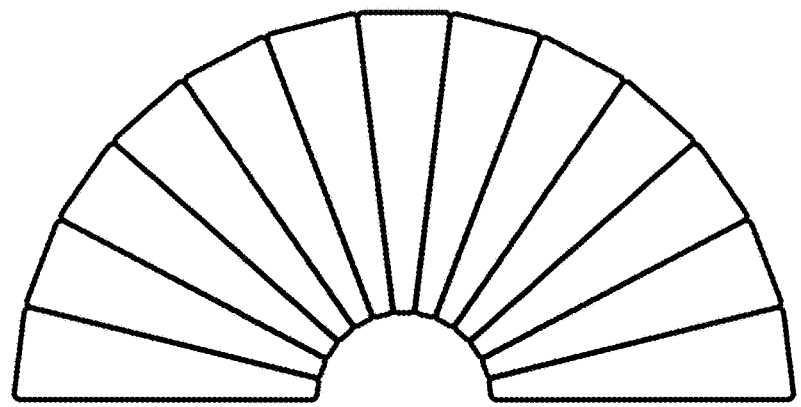
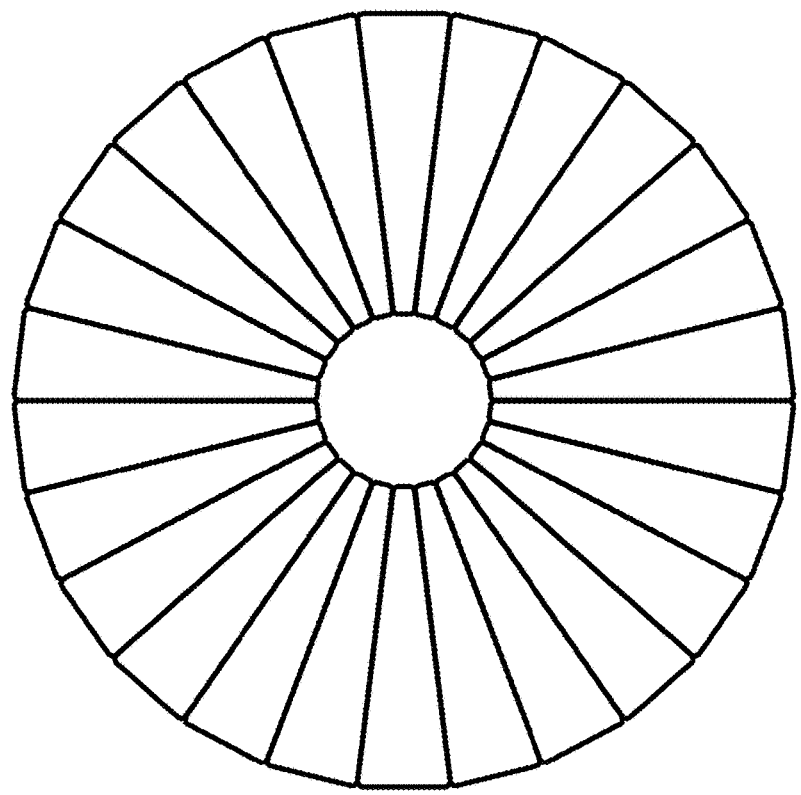

FIG. 13: Illustration of a modular configuration combining horizontal stacking and radial placement to form a continuous, repeatable looped structure
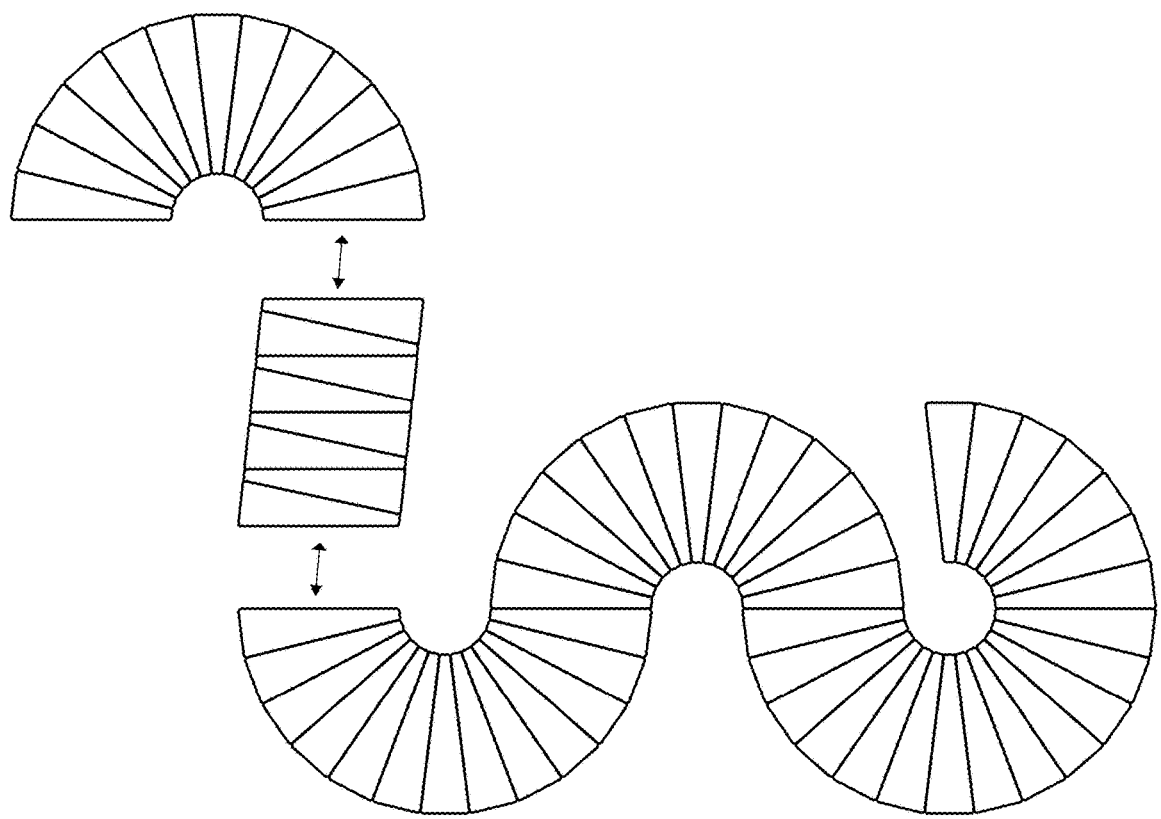

FIG. 14: Illustration Showing Grip Position of the Domino
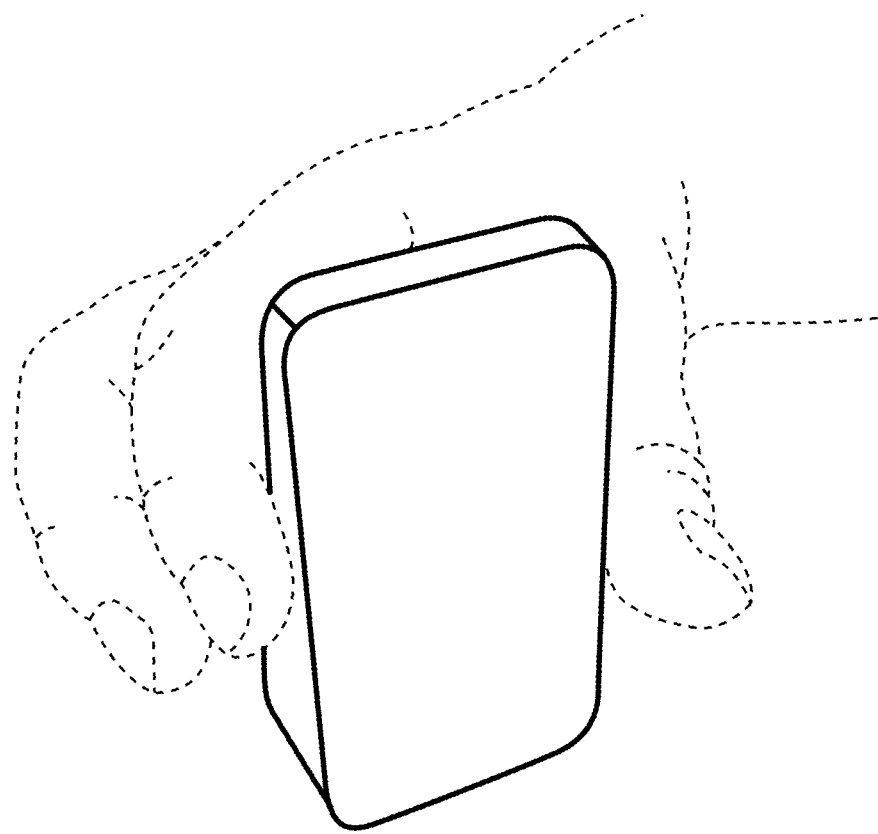
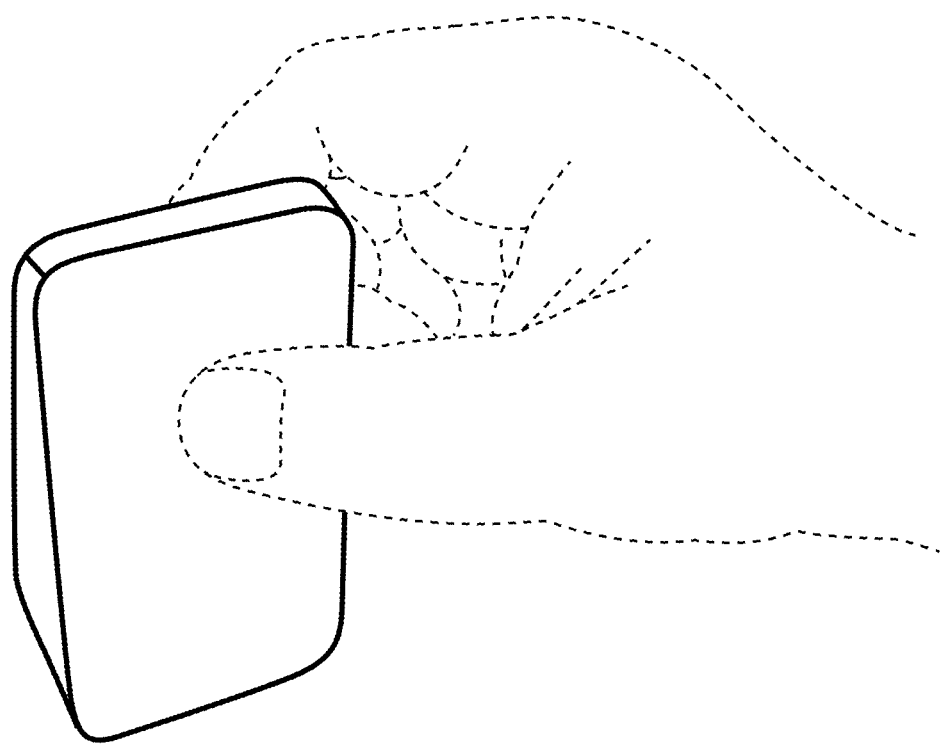

EASY-STANDING DOMINO WITH TRAPEZOIDAL PROFILE

FIELD OF THE INVENTION

The present invention relates generally to toy game pieces used in kinetic and spatial play, and more specifically to a toppling domino structure with a tapered or trapezoidal profile configured to improve upright stability, promote controlled toppling, and enhance usability in educational, therapeutic, and interactive environments.

BACKGROUND OF THE INVENTION

Traditional toppling dominoes typically have a uniform rectangular shape with equal width from base to top. While effective for standard play, they often lack stability and are difficult to stand upright, particularly for younger users or those with limited dexterity. Although individuals with refined motor skills may tolerate these limitations, many users experience difficulty maintaining upright placement. Despite widespread use, few alternatives have been proposed to improve ease of setup, balance, and safety. These shortcomings remain largely unaddressed in the existing art, particularly for users requiring improved ergonomic interaction and predictable kinetic performance.

While visually similar to number-based dominoes, the present invention is not directed toward traditional gameplay involving numerical matching or scorekeeping. Instead, it introduces a structural redesign intended specifically for kinetic play-focused on improved balance, setup stability, and controlled toppling behavior.

SUMMARY OF THE INVENTION

The present invention provides a toppling domino structure featuring a tapered, non-rectangular side profile-such as trapezoidal or wedge-shaped—with a wider, heavier base than top to enhance upright stability and minimize unintended tipping. The domino incorporates rounded edge contours for improved safety. One or more textured surfaces may also be provided to improve grip and handling, particularly for children or users with limited dexterity.

The trapezoidal shape further enables modular stacking behavior, allowing dominoes to be arranged in radial, circular, and layered configurations. As illustrated in FIGS. 11-13, these arrangements support continuous and repeatable geometric paths, distinguishing the invention from traditional rectangular domino designs.

The domino is available in multiple sizes, materials, and textures, and may include optional features such as internal base-weighting or tactile feedback. These additions enhance handling and usability across educational, therapeutic, and recreational settings.

The invention promotes balance, sequencing, and cause-effect learning, serving as both a plaything and an educational tool suitable for schools, libraries, workshops, and STEM programs.

Key aspects of the invention include a tapered geometry (e.g., trapezoidal or wedge-shaped) that lowers the center of gravity, rounded edge contours for user safety, optional internal weighting near the base for enhanced stability, and scaled size variants suited for various age groups and difficulty levels. The geometry further enables stacking-based spatial configurations-such as radial alignments, circular patterns, and looped arrangements. The domino may be manufactured from child-safe, durable materials such as plastic resins (e.g., biodegradable PLA), wood, rubber, or composite materials, and may include textured surfaces or color variations for improved grip, sensory feedback, or educational use.

Engineering Overview

The disclosed invention introduces a domino featuring a trapezoidal profile that tapers toward the top. This geometric modification lowers the center of gravity (CG) and increases the effective base width, resulting in enhanced upright stability and more predictable toppling performance. In contrast to prior art, the present invention achieves a dual-mode behavior-combining stable upright positioning and reliable dynamic toppling-through deliberate structural modifications rather than superficial design changes.

The use of a stable geometric foundation is a time-tested principle in engineering, physics, and architecture. Trapezoidal and flared-base shapes commonly appear in structural designs such as ancient pyramids and modern high-rises, where a wider base distributes mass and stabilizes the structure. In physics, both mass distribution-placing heavier weight toward the bottom—and tapered geometry are known to enhance balance by minimizing torque and increasing the stabilizing rotational resistance at the base (commonly referred to as the base moment). While this configuration enhances stability during setup, it also benefits controlled toppling, as the mass and shape allow for a more predictable and smooth rotational fall once initiated. Although the external geometric modification may seem minor, it yields significant and non-obvious improvements in usability, stability, and toppling dynamics-particularly in therapeutic and collaborative settings. Traditional rectangular toppling dominoes, by contrast, feature a uniform profile with parallel sides, typically resulting in a higher center of gravity (CG) and a narrower base. This configuration offers reduced resistance to lateral tipping forces, making them less stable in upright positions and more prone to uncontrolled toppling behavior. These limitations can be readily observed through comparative balance and fall dynamics against a widened-base, low-CG structure.

In mechanical stability theory, an object's resistance to tipping is directly influenced by its base width, the height of its center of gravity, and mass distribution. A wider base increases the stabilizing moment arm, while a lower center of gravity reduces the rotational torque required to initiate tipping. The present invention applies these principles to a kinetic toy-offering measurable and non-trivial improvements over traditional domino structures.

The following formula is used to determine the base width (Wb) of the trapezoidal domino as a function of the top width (Wt), height (h), and taper angle ($\theta$). This establishes how variations in taper affect the overall stability by altering the center of gravity and base support area.

Using a normalized top width Wt=1.0 and a standard domino height h=2.0 (reflecting a 2:1 height-to-width ratio), the base width of the invention can be calculated using the following formula, where $\theta$ is the taper angle:

$$Wb = Wt + 2h \cdot \tan(\theta)$$

For a taper angle of $\theta = 1.4°$ $$Wb = 1.0 + 2(2.0) \cdot \tan(1.4°) \approx 1.0 + 4 \cdot 0.02443 = 1.0977$$

This represents a 9.77% increase in base width compared to a standard rectangular domino. In other words, this dimensional change translates to a 9.77% improvement in resistance to intentional tipping, based on a proportional relationship between base width and stabilizing torque.

The 9.77% improvement described in paragraph is based on a normalized top width of 1.0 and height of 2.0 to reflect a typical domino ratio for clarity of geometric analysis. However, in practical implementation using standard toppling domino dimensions (e.g., 0.3" top width, 1.0" height), the same 1.4 degree taper results in a 16.3% increase in base width. This real-world result further confirms the functional significance of the taper described in claim 8, demonstrating functional advantage rooted in physical design—not aesthetics alone.

Furthermore, the taper angle serves not only as a geometric stabilizer but as a functional difficulty modifier across size variants. Shallower tapers (e.g., 4-12 degrees) increase the base width and provide forgiving balance, ideal for young learners or users with limited dexterity. Steeper tapers (e.g., 1.4-3 degrees), by contrast, reduce the footprint and increase the precision required to stand the domino upright, thereby introducing intentional challenge. This allows the domino to be used not just for play, but also as a developmental tool where different sizes and shapes can be introduced gradually to improve motor skills.

Even a shallow 1.4-degree taper results in a nearly 10% wider base, offering measurable improvement in resistance to tipping. Yet in none of these architectural or engineering contexts has this principle been applied to toy structures-such as dominoes—to simultaneously improve setup stability and prevent unintentional toppling, as disclosed in the present invention. Traditional dominoes have maintained a consistent rectangular profile for generations-a shape well suited for uniformity and stacking. However, the application of taper geometry introduces a novel structural feature that reimagines how stability and kinetic performance can be integrated into play-focused design.

BRIEF DESCRIPTION OF THE DRAWINGS

FIG. 1 is a front view of the domino piece showing its vertical face.

FIG. 2 is a side view showing the tapered side profile, including sidewalls, the widened base, and the narrow top edge.

FIG. 3 is a top view showing the narrow upper surface of the domino.

FIG. 4 is a bottom view illustrating the widened base that enhances stability.

FIG. 5 is a perspective view showing small, medium, and large domino size variants, each designed for different age groups or difficulty levels, with possible variations in base width, height, or taper angle.

FIG. 6 is a side cross-sectional and perspective view illustrating an optional internal weight placed near the base to lower the center of gravity, thereby improving upright stability.

FIG. 7 is a comparative view illustrating both a traditional domino and the redesigned version, highlighting the tapered side profile and a visual marker (dot) that indicates the center of gravity. In the tapered version, the center of gravity is illustrated slightly lower than it would be in actual implementation, for the purpose of visually emphasizing the functional distinction. As shown in FIG. 6, this center of gravity can be further lowered through the incorporation of an optional internal weight near the base, enhancing upright stability beyond what is achieved through geometry alone.

FIG. 8: Side view illustration highlighting the taper angle relative to a vertical axis, ranging from approximately 1.4 to 12 degrees, as described in claim 8—demonstrating the stability-enhancing geometry of the domino structure.

FIG. 9 is a side view illustrating a trapezoidal profile with a base that is at least 10% wider than the top, shown within a 2:1 height-to-width standard domino proportion.

FIG. 10 is a perspective view illustrating textured grip surface, such as shallow ridges, applied to one side of the domino to enhance handling.

FIG. 11 is an illustration demonstrating a stacking configuration in which dominoes are arranged horizontally to form layered assemblies. This stacking technique can serve as a bridging element between radial or circular arrangements, as shown in FIG. 12, and contributes to the continuous modular structure illustrated in FIG. 13.

FIG. 12 is an illustration of dominoes arranged in radial and circular configurations. This layout can also suggest directional flow or guide user placement as part of a modular setup. This radial technique integrates with the stacking configuration shown in FIG. 11 to form the continuous structure illustrated in FIG. 13.

FIG. 13 is a combination of the configurations illustrated in FIGS. 11 and 12, showing a modular arrangement in which dominoes are placed in both a horizontally stacked formation and a radial configuration. These elements are combined to form a continuous, repeatable geometric path.

FIG. 14 is an illustration showing how the domino may be ergonomically held in a user's hand, supporting usability and accessibility.

DETAILED DESCRIPTION OF THE INVENTION

The present invention discloses a toppling domino as illustrated in the associated drawings, featuring the following core elements:

Geometric Configuration:
The domino comprises a rectangular front face and rear face, each with child-safe rounded edges. The left and right sidewalls taper inward from a wider base to a narrower top, forming a trapezoidal or wedge-shaped profile when viewed from the side. This tapered geometry lowers the center of gravity and improves upright stability during setup.

This invention uniquely applies foundational principles of mass distribution and geometric stability to a kinetic play structure, resulting in a dual-mode behavior. The domino structure is configured to remain upright under static conditions during setup, yet reliably transition into a toppling motion when subjected to an external tipping force.

Geometric Stability Optimization:
Standard toppling dominoes commonly used in education and competitive play often follow a 2:1 height-to-width ratio. While not defined by formal standards, this proportion has become an industry norm through widespread use in professional demonstrations and learning environments. This serves as a practical reference for applying the taper angle and base-width percentage described herein. In one embodiment, the sidewall taper angle and the base-to-top width ratio function cooperatively to enhance the domino's balance and controlled toppling behavior. For example, a taper angle in the range of approximately 1.4 degree to 12 degree corresponds to a base that is at least 10% wider than the top when applied to standard domino proportions. This geometric configuration lowers the center of gravity and increases the effective footprint, providing a measurable advantage in upright stability (see claim 8) not attainable through aesthetic changes alone, thereby making the domino easier to stand upright and more predictable in its fall. The inclusion of both angular and proportional measurements helps define the invention's structural uniqueness and differentiates it from traditional rectangular domino designs. Please refer to FIG. 8 for the minimum and maximum tapering angles and FIG. 9 for the percentage ratio between base and top.

Material Composition:
The domino may be made from plastic resins (e.g., biodegradable PLA), wood, rubber, or other durable materials suitable for child-safe and impact-resistant applications.

Weight Distribution:
To further lower the center of mass and enhance balance, an optional internal weight may be securely embedded near the base, such as within a recessed cavity or molded channel. This weight may be integrated during manufacturing by overmolding, inserted post-molding, or secured using adhesive bonding or fasteners.

Size Variants:
The domino may be produced in at least three size variants—small, medium, and large—each optimized for different age groups, user needs, or difficulty levels. Typical heights may range from approximately 40 mm (small) to 80 mm (large), although exact dimensions are flexible. All variants retain the stability-enhancing profile within the specified taper range.

Manufacturing:
The domino may be manufactured using injection molding, 3D printing, CNC machining, or other suitable fabrication techniques. Dimensions may vary and are not essential to the invention. The surface texture may include, but is not limited to, shallow ridges, a matte finish, stippling, or similar grip-enhancing patterns to support easier handling by children or users with limited dexterity. Texturing may be achieved through mold surface etching, 3D printed patterns, or post-production treatments such as sanding or embossing.

Modular Configuration:
As illustrated in FIGS. 11 through 13, the domino is configured not only for toppling, but also for spatial construction through horizontal stacking and radial placement. These configurations encourage users to loop, connect, and experiment with color, shape, and pattern combinations-transforming traditional domino setups into creative, user-generated modular structures that support open-ended design and spatial reasoning.

As used herein, "modular" refers to the ability of each domino unit to function independently while also being combinable with other units to form extended, repeatable, and reconfigurable geometric arrangements. (see FIG. 13)

Usage:
Applications of the domino extend to, but are not limited to, individual users, daycares, schools, libraries, workshops, museum exhibitions, play-based learning labs, and kinetic art displays. These settings may feature interactive installations that demonstrate principles of balance, gravity, cause-and-effect, and STEM-oriented design.

In some configurations, the domino may include integrated or attachable sensory features such as color-changing LEDs, sound triggers, tactile surfaces, or vibration modules that activate upon toppling, providing enhanced sensory engagement for use in therapeutic or special needs learning environments.

The invention claimed is:

1. A domino structure comprising:
    a body having a generally symmetrical profile with a trapezoidal side geometry from a wider base to a narrower top;
    a front face and a rear face that are generally rectangular and include rounded edges;
    a center of mass located below a vertical midpoint of the body; and
    a base surface configured to provide upright stability and enable controlled toppling when manually initiated;
    wherein the front and rear faces taper inward from the base toward the top, forming a second trapezoidal profile along an axis perpendicular to the sidewalls such that the combined taper creates a three-dimensional wedge shape that further lowers the center of gravity and improves resistance to tipping;
    wherein the center of gravity is further lowered by an internal weight positioned asymmetrically below the geometric center, the weight being greater than 2 grams and structured to enhance recovery from partial tipping and stabilize the domino on uneven or soft surfaces; and
    wherein one or more exterior surfaces include tactile features selected from the group consisting of shallow ridges, stippling, and patterned contours such that the exterior features correspond to the direction of taper and are configured to enhance orientation awareness, grip security, and stacking alignment and wherein the textured surface provides necessary anti-slip friction to prevent slippage when multiple dominoes are stacked on top of each other.

2. The domino structure of claim 1, wherein a side profile of the domino structure comprises a non-parallel taper comprising a wedge-shaped or triangular contour that continuously narrows from the base to the top.

3. The domino structure of claim 1, wherein the body is configured to be stacked on its side such that it can be arranged in a horizontal orientation and still support controlled toppling behavior when triggered.

4. The domino structure of claim 1, wherein the sidewalls taper inward at an angle ranging from 1.4 degrees to 12 degrees relative to a vertical axis.

5. The domino structure of claim 1, wherein the structure includes sidewalls that taper at an angle of 1.4 degrees and a base width that is at least 10% wider than the top.

6. The domino structure of claim 1, wherein the body is formed from one or more materials selected from the group consisting of plastic resin, wood, rubber, and composite material.

7. A domino set comprising a plurality of domino structures of claim 1, wherein the set comprises domino structures of at least three sizes, each domino structure configured with a selected taper angle between 1.4 degrees and 12 degrees.

8. The domino structure of claim 1, wherein at least one surface of the body includes printed or tactile educational elements selected from the group consisting of raised letters, numbers, symbols, and visual images.

9. The domino structure of claim 1, wherein at least one surface of the body is configured to display character artwork, logos, or themed graphics associated with branded or licensed properties, the content being aligned with the trapezoidal geometry to support directional orientation, visual identity, or thematic engagement in promotional or retail settings.

10. The domino structure of claim 1, comprising a plurality of domino structures configured for interconnection with each other through horizontal stacking and radial placement, forming continuous modular arrangements in two or more directions.

11. The domino structure of claim 1, wherein one or more surfaces or internal features are configured to produce tactile, auditory, or visual sensory feedback selected from the group consisting of texture changes, audible clicks, and visual cues during toppling or handling.

12. A domino set comprising a plurality of domino structures of claim 1, wherein each domino structure in the set includes a sequential visually or tactilely distinct marker selected from the group consisting of letters, numbers, and themed symbols.

13. The domino structure of claim 1, wherein at least one surface is configured for erasable, writable, or markable use using dry-erase, chalk, or magnetic materials.

\* \* \* \* \*